Aug. 10, 1926.

C. A. JUENGST 1,595,101

METHOD OF AND MACHINE FOR ASSEMBLING SIGNATURES

Filed July 1, 1925   15 Sheets-Sheet 2

Inventor
Charles A. Juengst
By his Attorney
Philip C. Rich

Aug. 10, 1926.  
C. A. JUENGST  
1,595,101  
METHOD OF AND MACHINE FOR ASSEMBLING SIGNATURES  
Filed July 1, 1925 15 Sheets-Sheet 3

Inventor  
Charles A. Juengst  
By his Attorney  
Philip C. Peck

Aug. 10, 1926.  
C. A. JUENGST  
1,595,101  
METHOD OF AND MACHINE FOR ASSEMBLING SIGNATURES  
Filed July 1, 1925   15 Sheets-Sheet 4
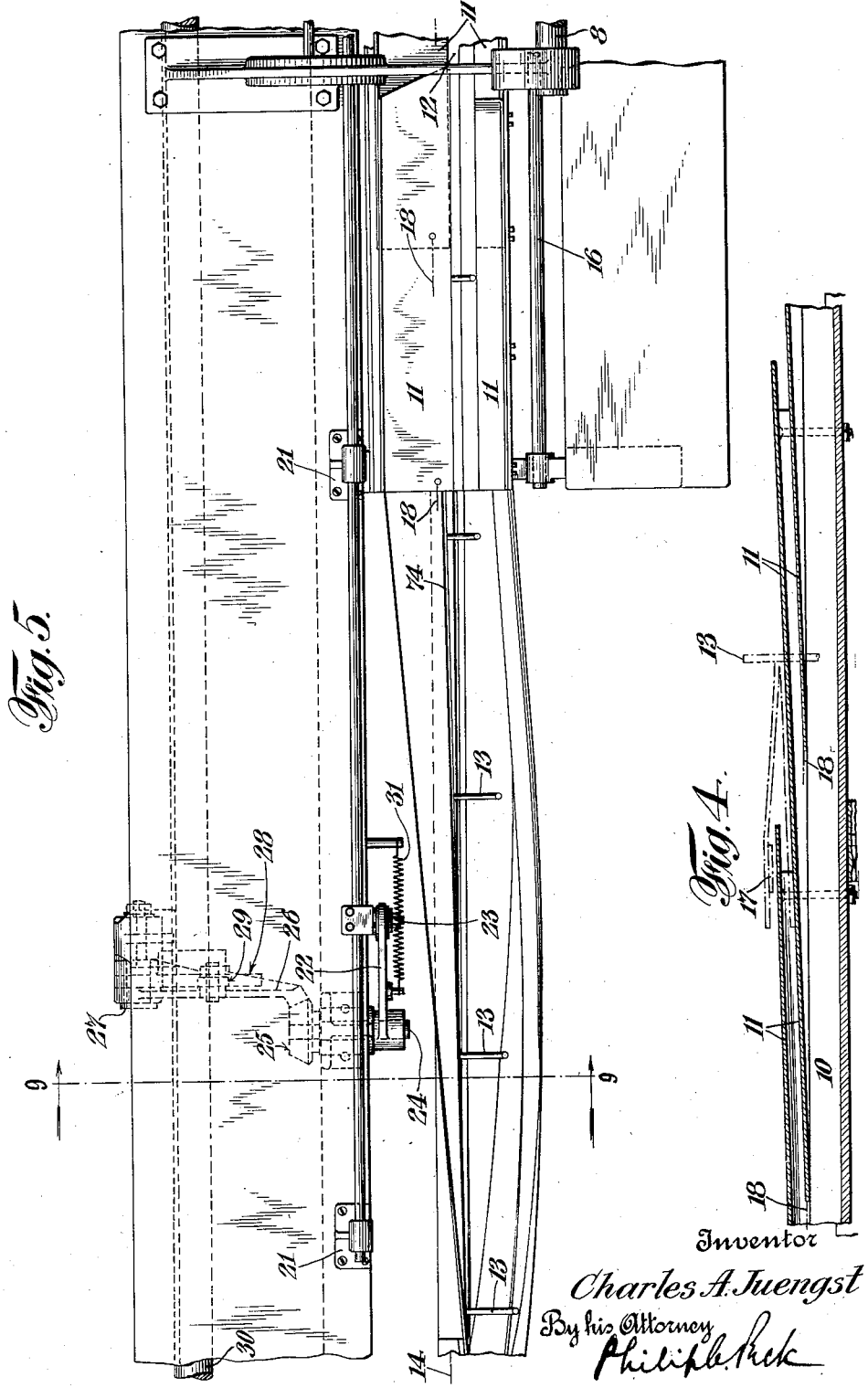
Inventor  
Charles A. Juengst  
By his Attorney

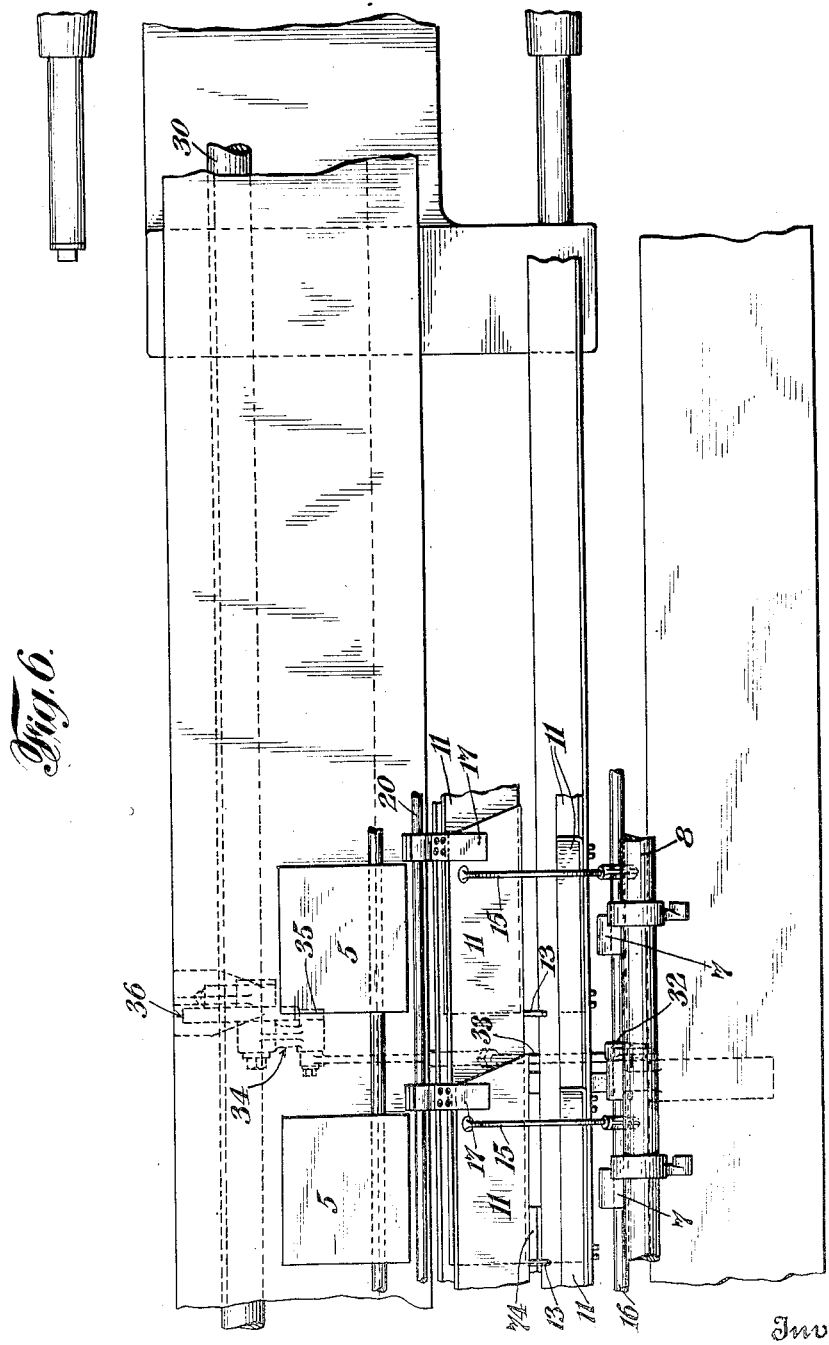

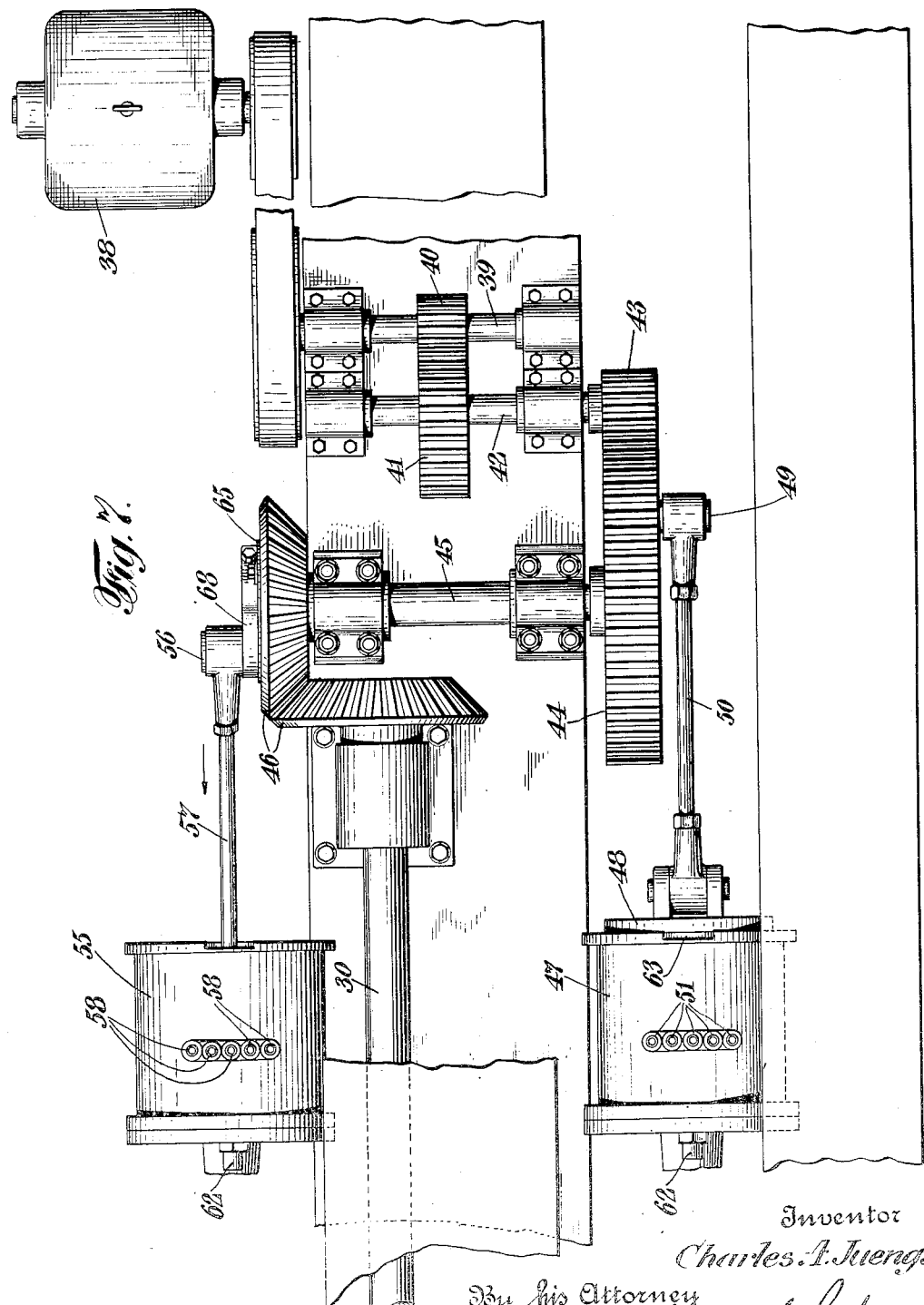

Aug. 10, 1926.

C. A. JUENGST 1,595,101

METHOD OF AND MACHINE FOR ASSEMBLING SIGNATURES

Filed July 1, 1925  15 Sheets-Sheet 7

Inventor
Charles A. Juengst
By his Attorney
Philip L. Rich

Aug. 10, 1926.  
C. A. JUENGST  
1,595,101  
METHOD OF AND MACHINE FOR ASSEMBLING SIGNATURES  
Filed July 1, 1925    15 Sheets-Sheet 9

Inventor  
Charles A. Juengst  
By his Attorney  
Philip B. Rick

Aug. 10, 1926.   1,595,101
C. A. JUENGST
METHOD OF AND MACHINE FOR ASSEMBLING SIGNATURES
Filed July 1, 1925    15 Sheets-Sheet 11
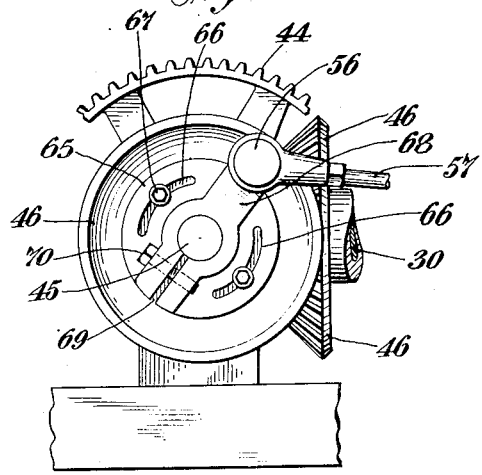
Fig. 12.
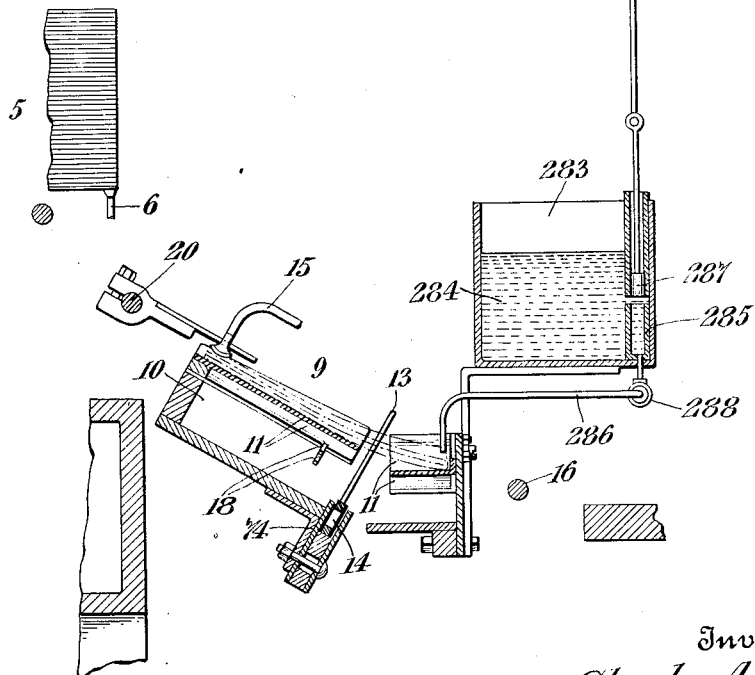
Fig. 13.
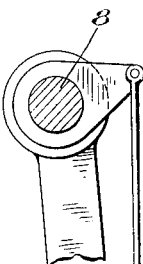
Inventor
Charles A. Juengst
By his Attorney
Philip C. Rick

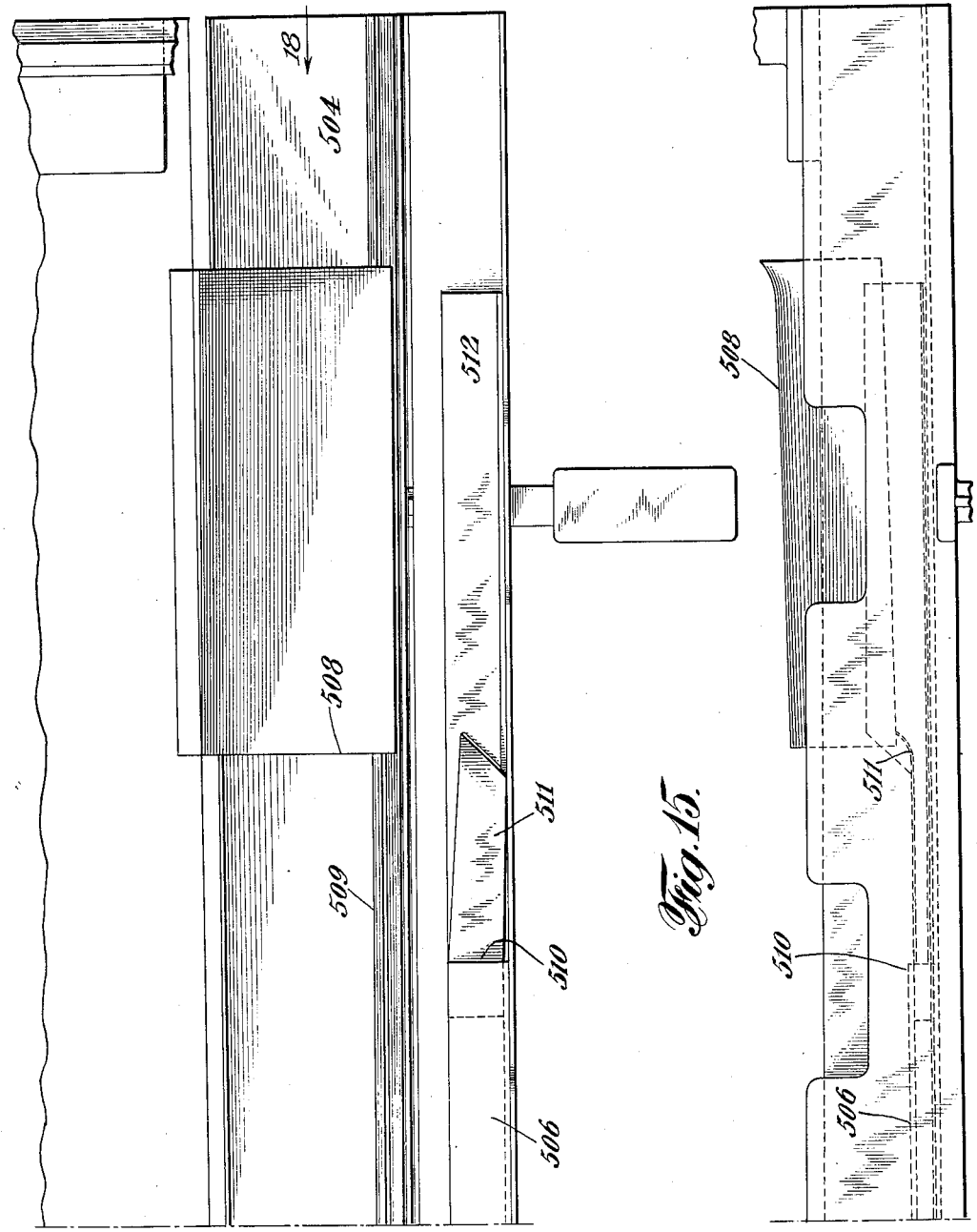

Aug. 10, 1926.                                            1,595,101
C. A. JUENGST
METHOD OF AND MACHINE FOR ASSEMBLING SIGNATURES
Filed July 1, 1925     15 Sheets-Sheet 13
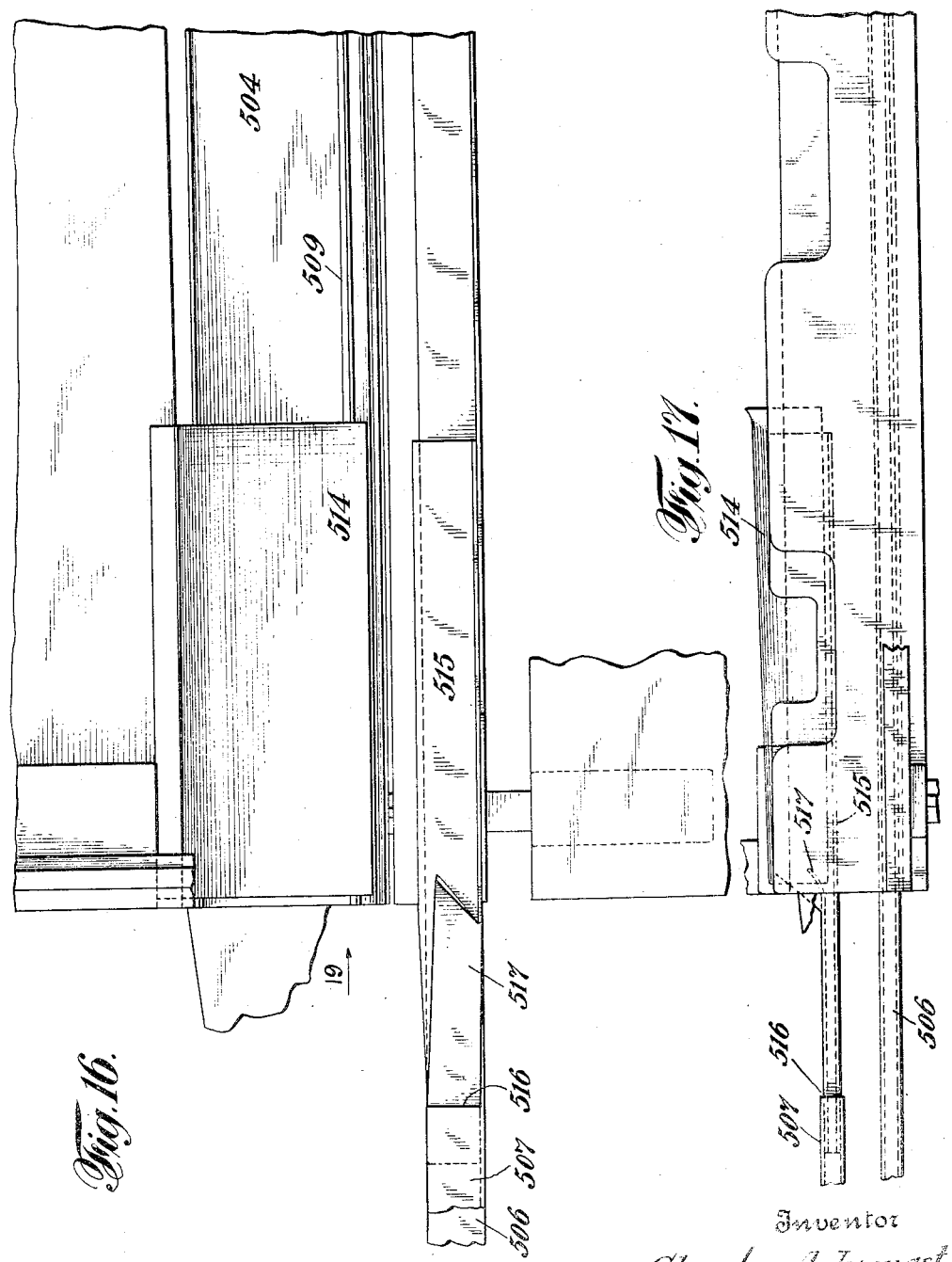

Aug. 10, 1926. 1,595,101
C. A. JUENGST
METHOD OF AND MACHINE FOR ASSEMBLING SIGNATURES
Filed July 1, 1925  15 Sheets-Sheet 14

Inventor
Charles A. Juengst
By his Attorney
Philip C. Rich

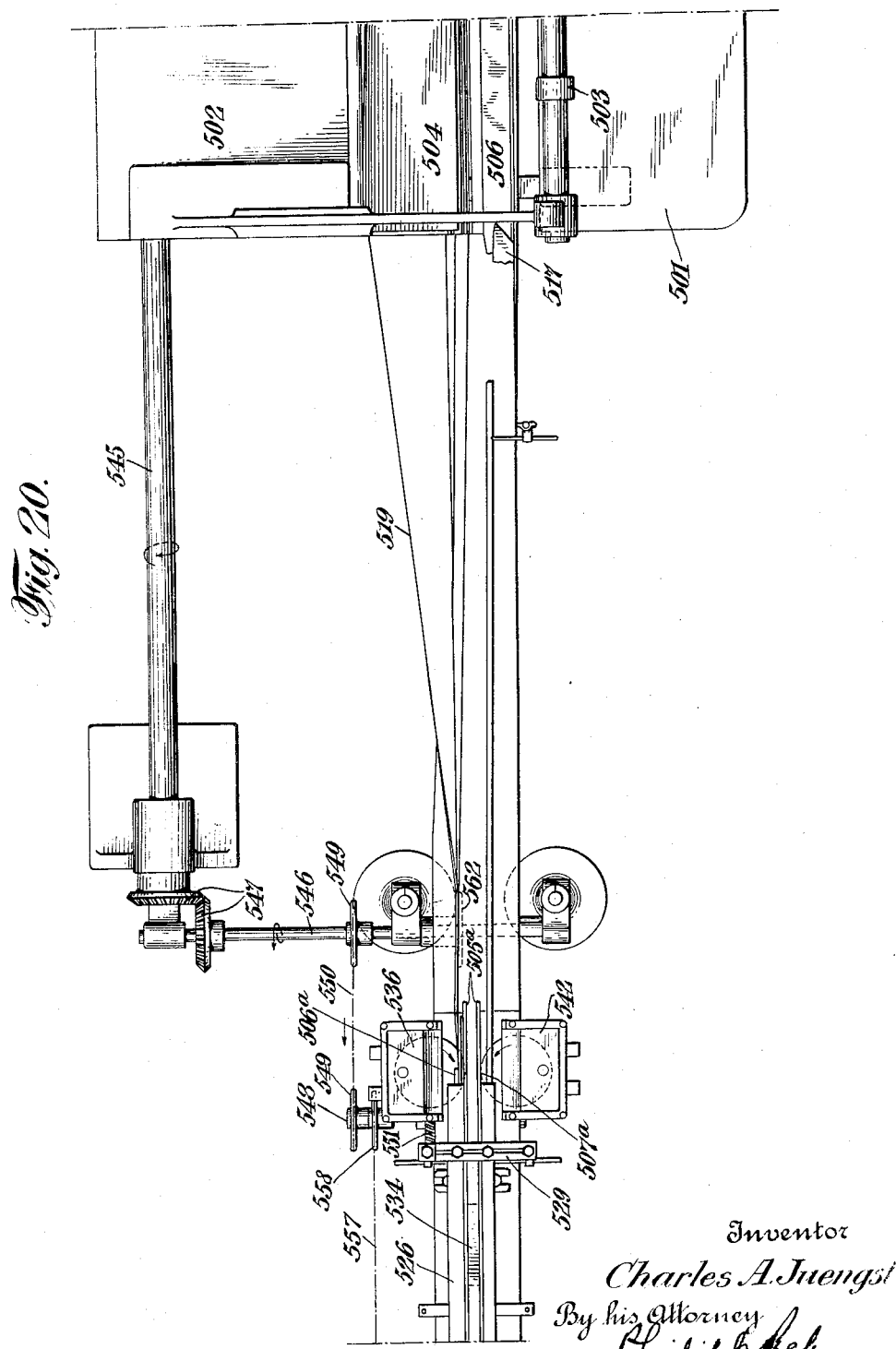

Patented Aug. 10, 1926.

1,595,101

UNITED STATES PATENT OFFICE.

CHARLES A. JUENGST, OF CROTON FALLS, NEW YORK, ASSIGNOR TO AMERICAN ASSEMBLING MACHINE COMPANY, INC., OF NEW YORK, N. Y., A CORPORATION OF DELAWARE.

METHOD OF AND MACHINE FOR ASSEMBLING SIGNATURES.

Application filed July 1, 1925. Serial No. 40,853.

This invention relates to a method of and a machine for gathering signatures into a signature group and comprises divisional matter contained in part in my prior applications Ser. No. 469,693 filed May 14, 1921, and Ser. No. 661,344 filed Sept. 7, 1923.

The main object and feature of the invention is to admit of signatures being gathered with greater certainty and expedition than heretofore and also to admit of certain other operations being carried out such as sewing or pasting of the signatures either during the act of gathering or subsequently thereto.

In the accompanying drawings the invention is disclosed in several concrete and preferred forms in which Figs. 1, 2 and 3 when placed end to end show a side elevation, partly in section, of one form of gathering machine embodying the invention.

Fig. 4 is a vertical section of the lower compartment and false bottom shown in Fig. 8.

Figure 1:
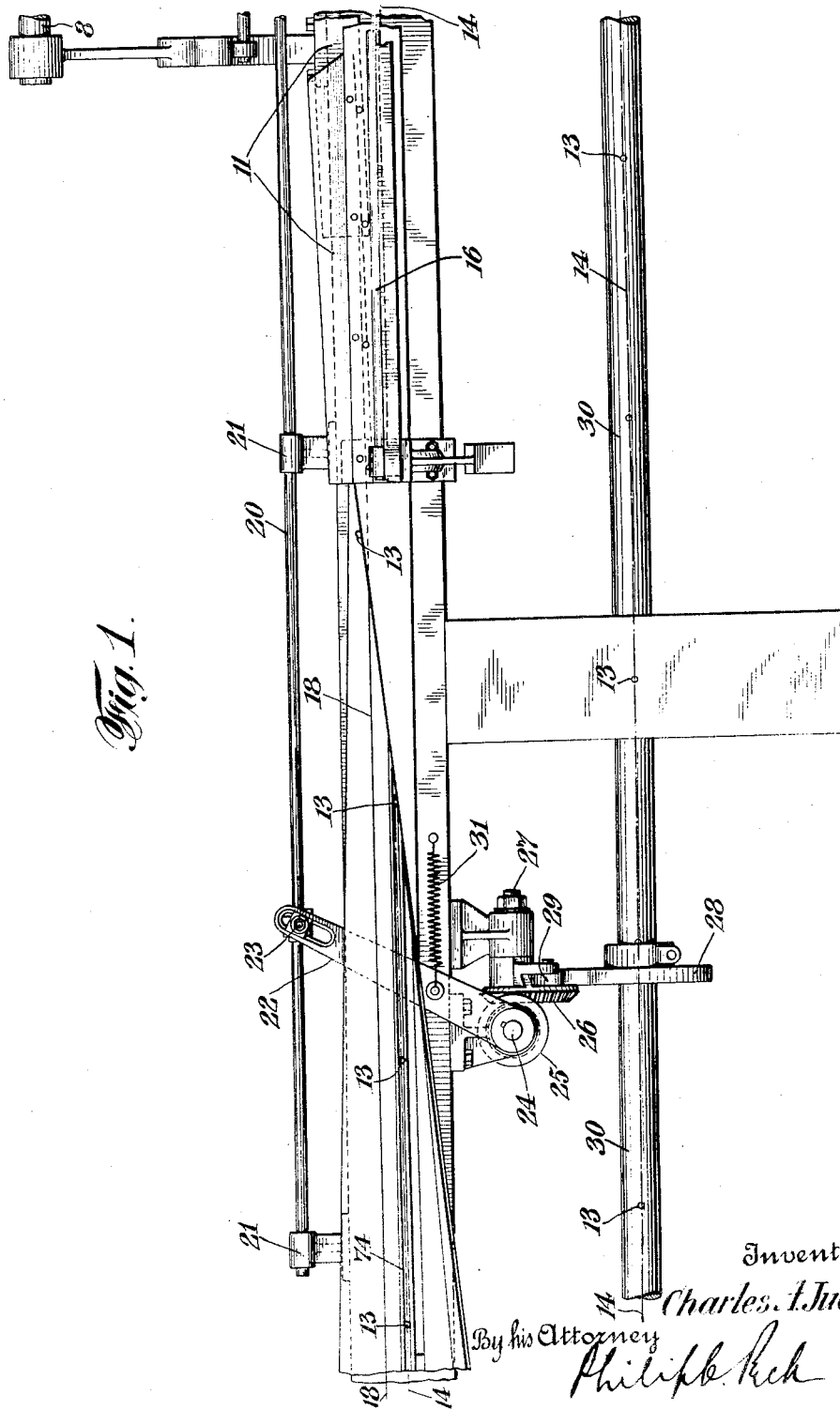
Fig. 1 is a side elevation of one end of a gathering machine and a turning device for changing the position of the signature groups from a substantially horizontal to a substantially upright position.
Figure 2:
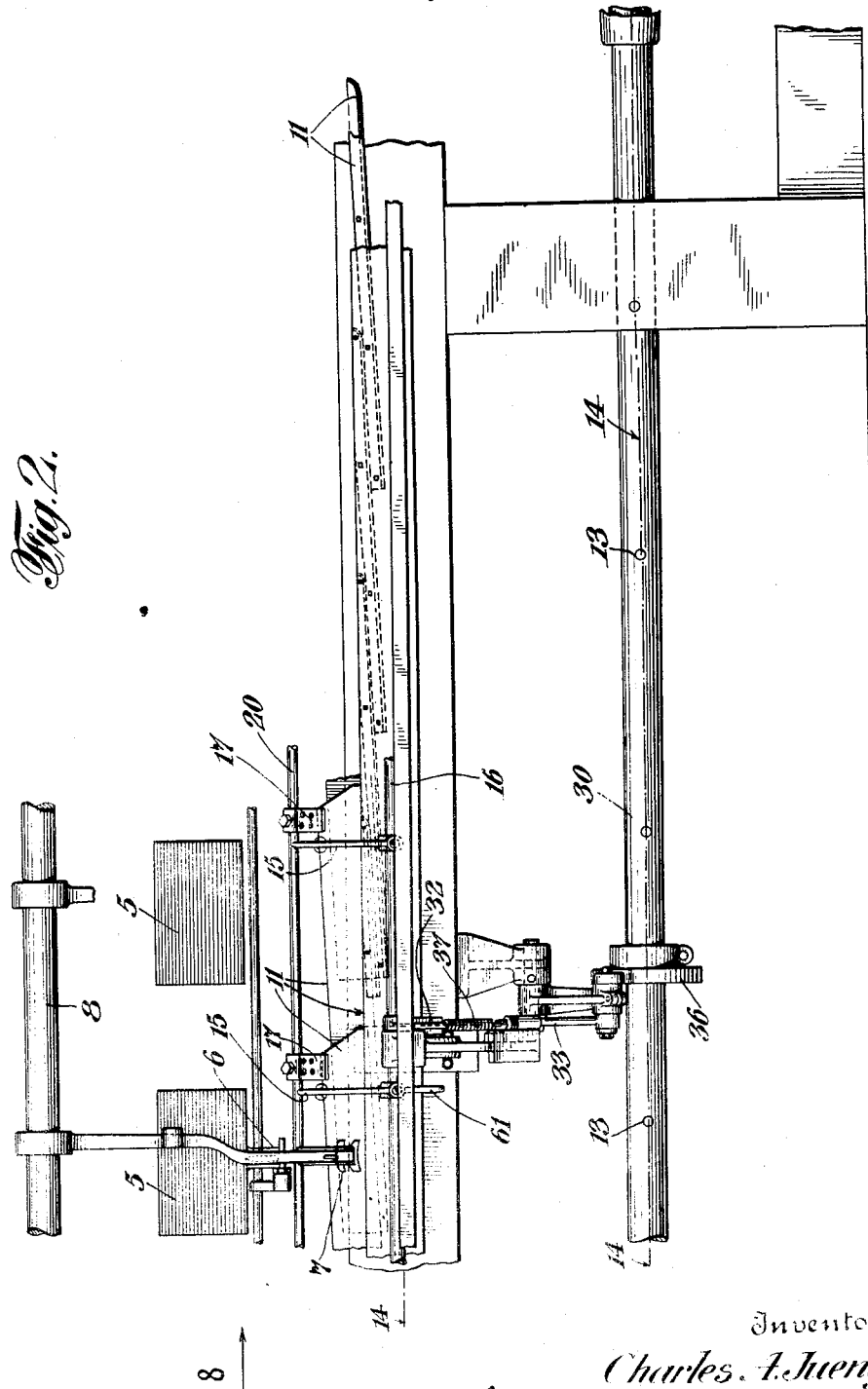
Fig. 2 is a side elevation showing a portion of the gathering mechanism.
Figure 3:
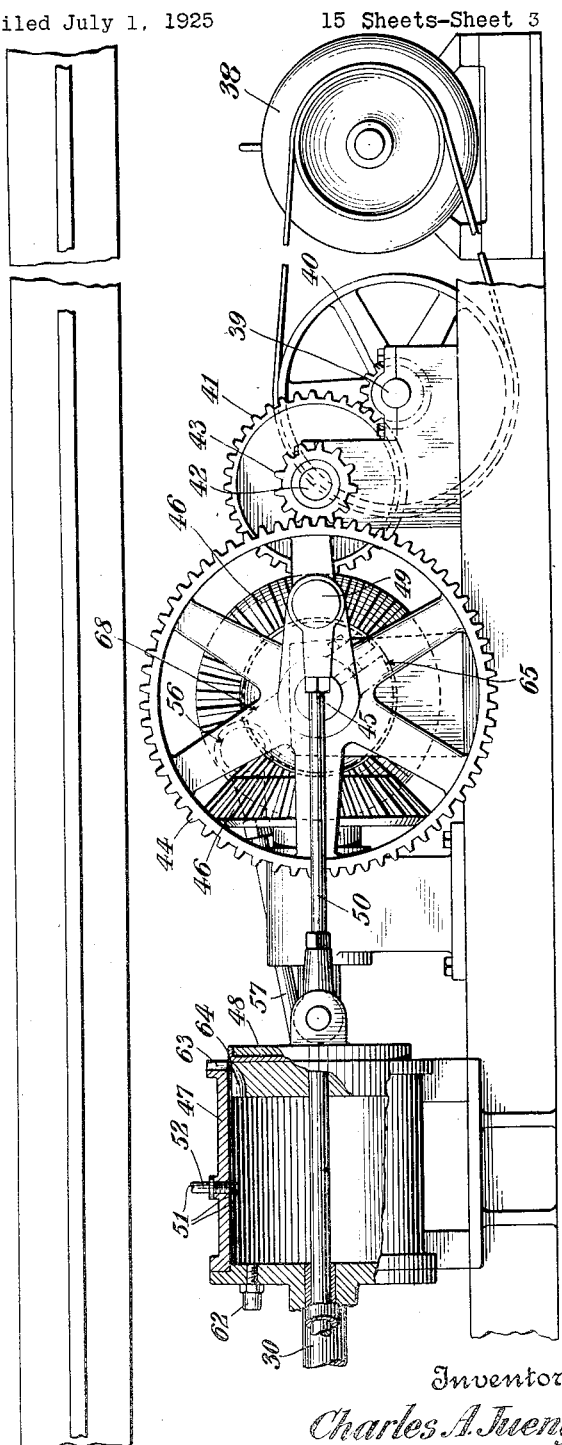
Fig. 3 is a side elevation, partly in section, of a power unit, adapted to be used in connection with the machine.

Figs. 5, 6 and 7 when placed end to end show a plan view of the gathering machine disclosed in Figs. 1, 2 and 3.

Fig. 5 is a plan view of Fig. 1.
Fig. 6 is a plan view of Fig. 2.
Fig. 7 is a plan view of Fig. 3.

Figure 8:
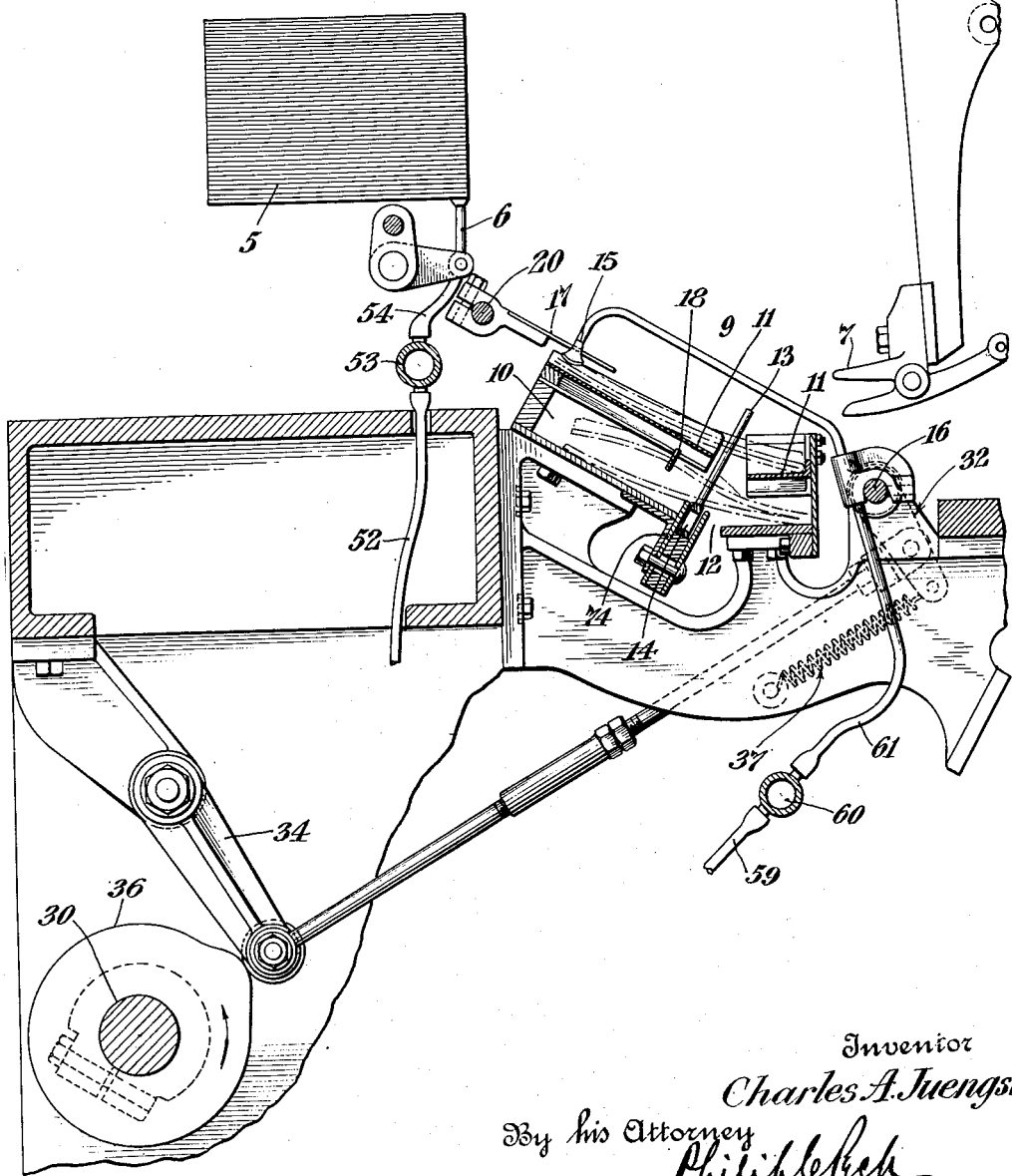

Fig. 8 is a vertical transverse sectional view looking in the direction of arrow 8 in Fig. 2.

Figure 9:
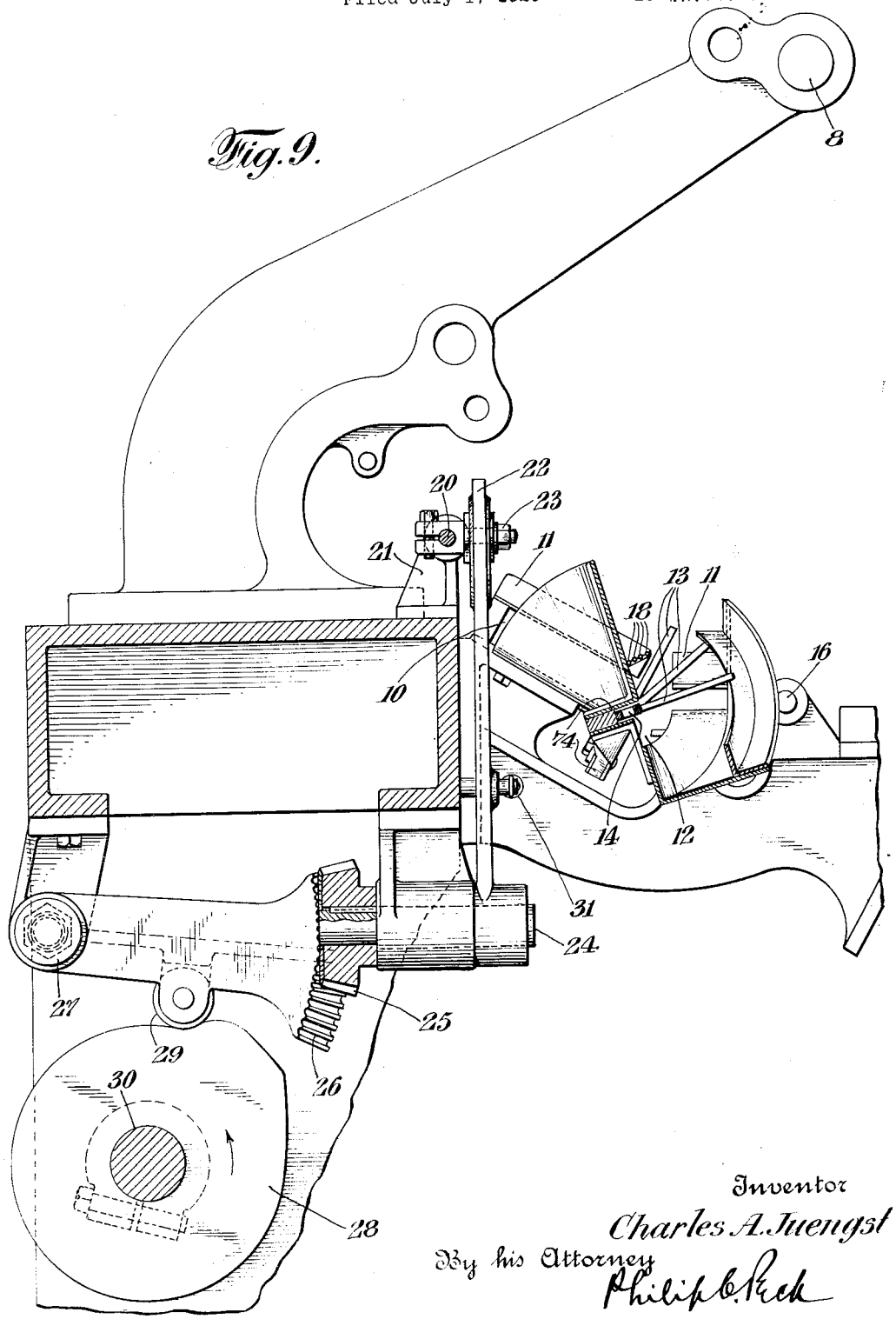

Fig. 9 is a vertical transverse sectional view on the plane of line 9—9 of Fig. 5.

Figure 10:
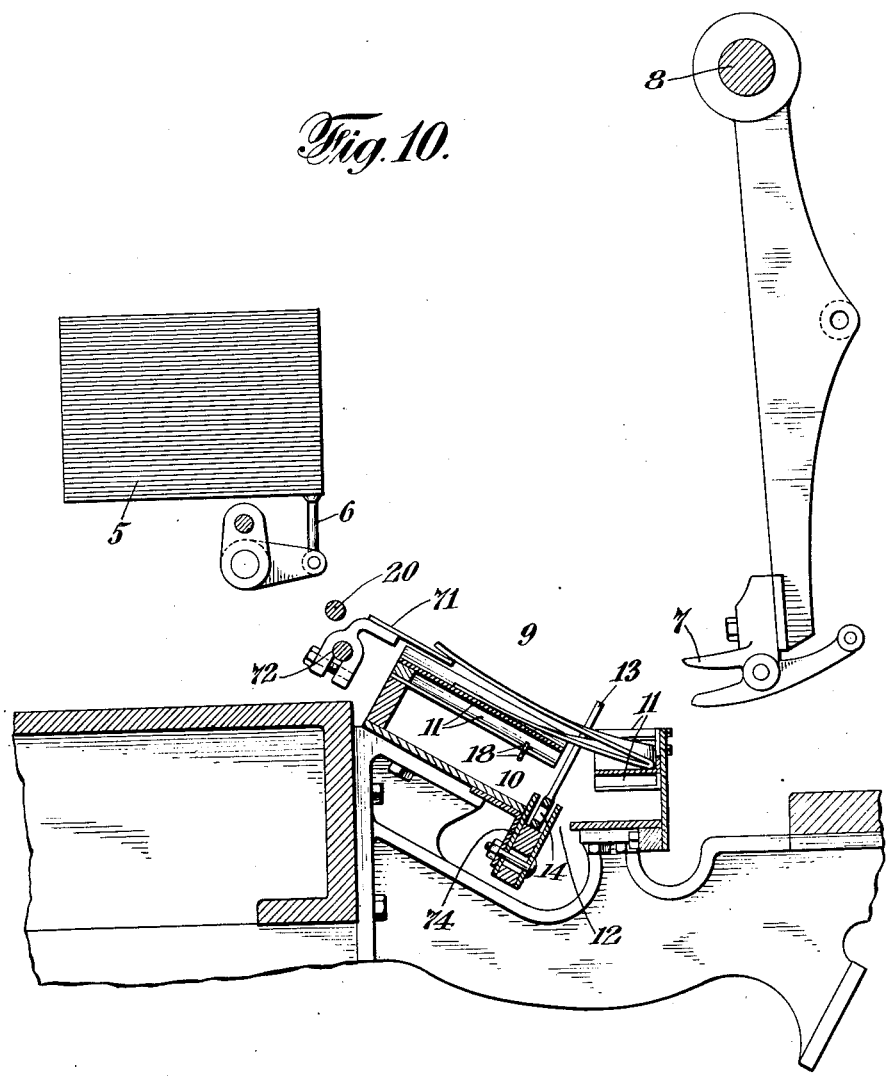

Fig. 10 is a vertical sectional transverse view similar to Fig. 8 but showing a modified form of the invention.

Figure 11:
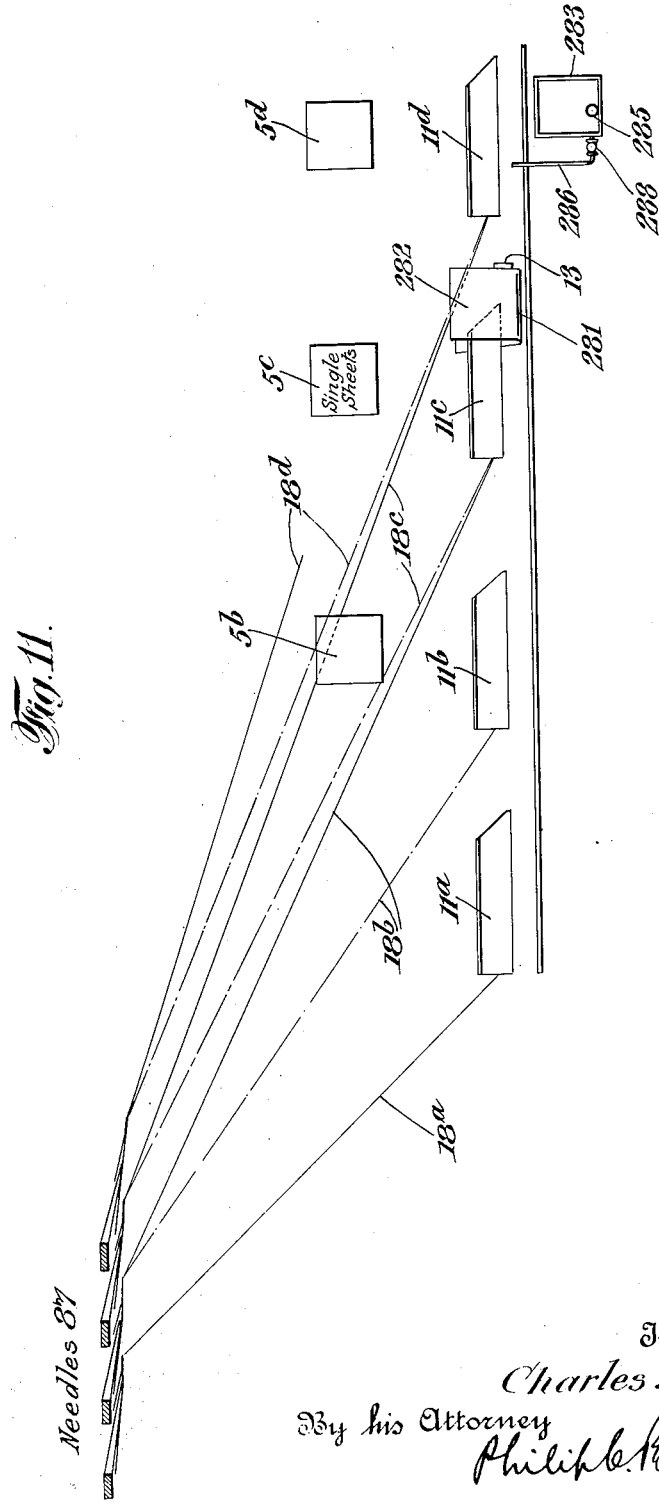

Fig. 11 is a distorted diagrammatic view showing the method of tipping single sheets to folded signatures and of conveying the thus combined signatures to a needle in the sewing machine.

Fig. 12 is a detail view showing the adjustable crank 56 of Fig. 7.

Fig. 13 is a view somewhat similar to Figs. 8 and 10 showing a modified form of the invention in which glue is applied to the signature while being gathered.

Figs. 14 to 20 are views of a modified form of the invention.

Fig. 14 is a plan view of a portion of the raceway of a gathering machine adjacent to the point where the first signature is placed in the machine.

Fig. 15 is a view in side elevation of the parts shown in Fig. 14.

Fig. 16 is a plan view of a portion of a raceway of a gathering machine adjacent to the point where the last signature is placed in the machine.

Fig. 17 is a view in side elevation of the parts shown in Fig. 16.

Figure 18:
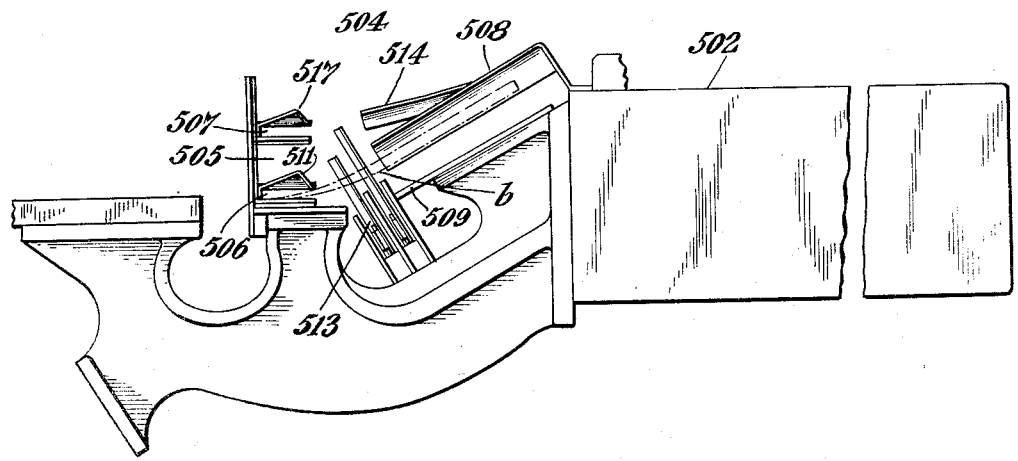

Fig. 18 is an end view of the parts shown in Figs. 14 and 15 looking in the direction of arrow 18 of Fig. 14.

Figure 19:
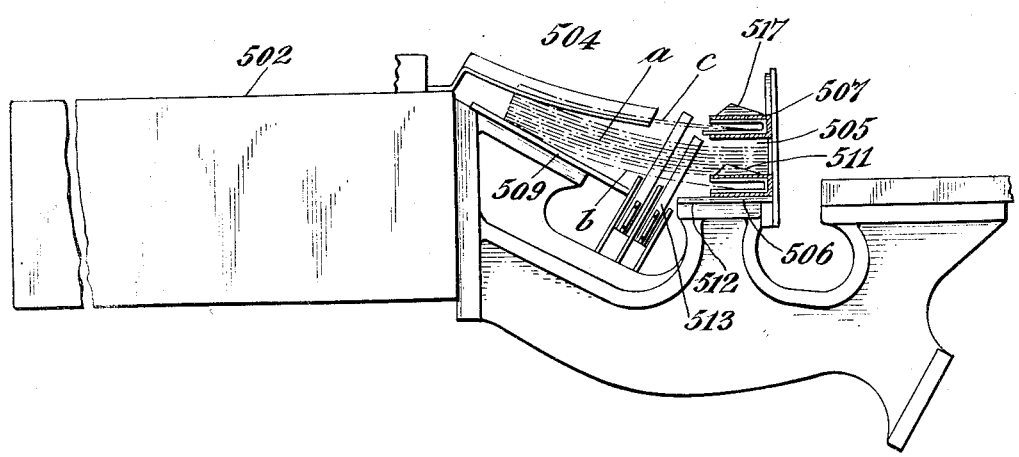

Fig. 19 is an end view of the parts shown in Figs. 16 and 17 looking in the direction of arrow 19 of Fig. 16.

Fig. 20 is a plan view showing one end of the gathering machine and the adjacent end of the tipping machine.

Referring particularly to Figs. 1 to 9 inclusive the gathering mechanism consists of the usual series of hoppers 5 in which the signatures are stacked and suitable means are provided for removing the signatures from the hoppers such as suckers 6, which pull down the folded end of the signatures from the pile in the usual way, and grippers 7, mounted on rock shaft 8, which swing back and forth and seize the lowermost signatures in the hoppers and carry them out and drop them on a raceway generally designated by the reference character 9. The raceway 9 comprises a lower compartment 10 and a series of overlapping ledges or vanes 11 which constitute a false bottom in the raceway as shown in Figs. 4 and 8. There is a slot 12 both in the lower compartment and in the false bottom through which project pins 13 mounted on a conveyor chain 14 such as is generally employed in gathering machines. Each gripper 7 deposits a signature on false bottom 11 and immediately thereupon a suction member 15 mounted on rock shaft 16 descends into contact with one of the free corners of the signature and effects a preliminary separation of the two halves thereof. Immediately thereafter a separating blade 17 moves longitudinally of the signature and effects a more complete separation of the two halves thereof. Pin 13 on the gathering machine conveyor then moves the signature longitudinally of the machine (Fig. 4), and in so doing brings the separated halves of the signature into a straddling position with respect to the next successive ledge or vane 11. It will be noted from Fig. 4 that said vanes or ledges have a slight downward incline in the direction of movement of the signature so as to eventually bring the signatures into superposed relation in lower compartment 10. When pin 13 has brought a signature into straddling position on a vane 11 the next succeeding signature will be superposed by the next gripper 7 on top of one half of said first signature. Fig. 4 shows a signature in straddling position on one of the vanes 11 and ready for the next signature to be superimposed thereon. Connected to the lower end of each vane 11 is a guide wire 18 (Figs. 4, 5 and 11) that continues from that point to a needle bar guide in the sewing machine. In the present embodiment such ordinary wire 18 extends from end vane 11 to a needle bar guide of a sewing machine forming either a part of or located extraneously of the gathering machine, so that each signature of each group is carried on its guide wire 18 and thereby has its halves maintained in slightly separated position on its own guide wire 18 until the sewing has been performed. The preliminary separating blades 17 are mounted on a slidable shaft 20 carried in suitable brackets 21 and reciprocated by means of arm 22 secured by means of slotted connection 23 with said shaft 20 and in turn mounted on shaft 24 on which is carried a bevel gear 25 to which an oscillating motion is imparted by means of a gear sector 26 mounted on stub shaft 27 and rocked by means of cam 28 engaging cam roll 29, said cam 28 being mounted on the main shaft 30 of the machine. A spring 31 connects arm 22 with the framework of the machine and serves the function of keeping cam roll 29 in engagement with cam 28. Any suitable means may be employed for rocking suction member 15. In this instance said member is carried by rock shaft 16 provided with an arm 32 connected by link 33 to rock arm 34, roller 35 of which is engaged by cam 36 on the main shaft, said roller being held in engagement with said cam by the action of spring 37 connecting arm 32 with the frame work of the machine. The means for actuating suckers 6 and gripper 7 are not shown since these devices are well known in the art in the well known Juengst gathering machine.

The means for producing suction in suckers 6 and 15 may take many forms but are preferably constructed as follows:

Referring to Figs. 3 and 7, main shaft 30 is connected with a suitable power transmission mechanism here shown as motor 38 having a belted drive to shaft 39 said shaft having a pinion 40 engaging gear 41 on shaft 42 which latter carries a pinion 43 engaging spur gear 44 on crank shaft 45. Motion is imparted from this crank shaft to the main shaft by means of bevel gears 46. 47 is a suction cylinder having a plunger or piston 48 connected to a crank pin 49 by means of rod 50. Cylinder 47 has a plurality of apertures 51 connected by suitable flexible connections 52 (see Fig. 8) to hollow shaft 53 connected to sucker 6 by a flexible connection 54. Similarly 55 is a second cylinder operated from crank 56 by means of connecting rod 57 and having a plurality of apertures 58 connected by flexible connections 59 to a hollow shaft 60 (see Fig. 8) which in turn is connected to opening member 15 by means of flexible connections 61. The internal construction of cylinders 47 and 55 is alike and is shown in section in Figure 3. Taking one as an example of both, piston 48 reciprocates in the cylinder and on the stroke to the left in Figure 3 effects opening of check valve 62 after it passes apertures 51 so as to prevent an accumulation of pressure in the closed end of the cylinder and on its stroke in the right hand direction in Figure 3 creates a suction through apertures 51 until the end of piston 48 approaches the end of its stroke in a right hand direction, when, owing to the cutout portion 63 in cylinder 47 and aperture 64 in the piston a quick release of the suction is obtained by the ingress of air. It will be understood that cams 36 and 28 are adjustable so as to obtain the proper timing of the parts and so likewise the member on which crank pin 56 is mounted is adjustable as shown in Figure 12. In this figure bevel gear 46 mounted on shaft 45 is provided with an adjustable member 65 provided with arcuate slots 66 and bolts 67 whereby said member 65 may be adjusted circumferentially with respect to shaft 45. Formed integrally with adjustable member 65 is a crank arm 68 carrying crank 56 and a casting comprising member 65 and crank arm 68 is split as shown at 69 and clamped to the shaft 45 by means of bolt 70.

In the form of the invention shown in Figure 8 it has been assumed that the signatures are provided with closed heads since otherwise there would be no certainty that sucker 15 would separate the signatures at their middle portion. When signatures with open heads are used it is convenient to employ the expedient shown in Figure 10. In this figure suckers 15 are omitted or they may simply be rendered inoperative as will be understood and reciprocating shaft 20 is also rendered ineffective as by removing separating blades 17. When open head signatures are used it is proposed to fold the signatures off center so that one half of the leaves will be wider than the other half. By mounting adjacent to each ledge or vane 11 a supporting member 71 which may be carried by a rod as 72 it will be understood that when gripper 7 drops the signature with the short side of the signature lowermost said short side will fall on ledge 11 but that the upper side will fall on supporting surface 71 as indicated in Figure 10 and that a separation of the two halves of the signature will thus be effected. After this occurs pin 13 on the conveyor chain will then move the signature longitudinally and cause it to straddle the next succeeding ledge 11.

As shown more particularly in Figures 1 and 9 the vanes or ledges 11 terminate a short distance beyond the last hopper of the gathering machine but lower compartment 10 continues and forms a suitable means not merely for supporting the signature group but also for the purpose of turning the said signature group from a substantially flat position into a substantially upright position and to this end said lower compartment takes the form of a spiral as shown more particularly in Figures 1, 5 and 9 and the gathering machine chain 14 is likewise given a twist so that pins 13 are gradually turned from a more or less upright position to a more or less of a horizontal position, or the turning device may be of a different character, such, for instance as shown in Patents 846,923 of March 12th, 1907, and Reissue 13,987 of August 24, 1915.

Raceway 9 is provided with a guide 74 so inclined as to present pins 13 at the proper angle to the flatwise disposed signatures during the major portion of its travel through the gathering machine and, at the end of the gathering machine, said guide 74 is of spiral formation to correspond to the similar spiral formation of the side walls of lower compartment 10.

The construction and operation of the device has been described as it would be used in connection with sewing machines located either within or without the gathering machine. It will be understood, however, that the invention is not limited in its use to a machine employing sewing means. The feature of the false bottom is of great advantage in an ordinary gathering machine and for these reasons: In the ordinary gathering machine, the signatures are delivered by the swinging grippers to a level that varies with the number of previously deposited signatures; that is, adjacent the first hopper the signature will be delivered at a level equal to the bottom of the raceway, while at the tenth box the level will be the bottom of the raceway plus the thickness of nine previously deposited signatures, and inasmuch as all the grippers release the signatures at substantially the same point it will be understood that different signatures have different distances to travel in the same period of time after being released and that no two signatures settle in the raceway under the same conditions. By having a false bottom composed of ledges, vanes, plates or other supports all the signatures travel the same distance after being released and have the same time in which to settle. If it is desired, therefore, to use the feature of the false bottom in an ordinary gathering machine all that it is necessary to do is to omit sucker 15 and separating member 17 as well as guides 18 so that the movement of the conveyor chain may serve to move a signature off its ledge directly into the lower compartment without straddling the next ledge. In that case also, it is not necessary to have the vanes or ledges overlapping.

Under certain circumstances it is desirable to paste or tip two signatures together; for instance in a sewn book it is customary to tip one end signature to the one next adjacent thereto and sometimes both end signatures are tipped to the signatures next adjacent, this has heretofore constituted a separate operation, and it will be understood that it would be a great convenience if the tipping can be done during the process of gathering or immediately thereafter without the necessity of a separate handling of the signature groups. In Figs. 11 and 13 is shown a simple device for applying this line of glue to the side of a signature while traveling forward under the influence of pin 13. 283 indicates a tank containing a body of adhesive 284 and provided with a cylinder 285 near its lower end from which leads a very small diameter pipe 286 terminating at a point above the signature placed upon vane 11. 287 is a plunger actuated by suitable means such as from rockshaft 8 that descends into cylinder 285 and forces a charge of adhesive through pipe 286 and thus on the signature in a line parallel to the folded lower edge of said signature. A valve 288 is provided which opens when plunger 287 descends and closes when it rises. The actuation of plunger 287 is so timed that the ejection of adhesive takes place only during the time that the signature is moving from one vane 11 into straddling position on the next vane 11, as previously described, and it will be understood that when the next signature is delivered on top of the first signature such as 282 that said signatures will adhere by reason of the line of glue 281. In case it is merely desired to paste the two last signatures together the gluing attachment will be arranged adjacent to the second last hopper of the gathering machine. There may however be a glue attachment associated with each hopper if so desired, which attachment can be rendered ineffective at will in any suitable manner, so that the gathering machine may in effect also become a tipping machine. This is of considerable importance in this machine, although its use is not limited to a machine of this particular character, because it will be understood that it is impossible to convey single sheets along wires 18 and it is therefore necessary to either tip the singles before stacking the signatures in the hopper of the gathering machine or to have the gathering machine automatically tip the singles to a signature having a folded back. In Fig. 11 is shown a diagrammatic view in which the parts are distorted for the purpose of clearness, said diagrammatic view showing an adjustment that must be made in case one of the hoppers of the gathering machine contains singles. It will be apparent that if one of the hoppers of the signature gathering machine contains singles that are to be pasted to a folded signature that wire 18 leading from the next succeeding vane 11 would carry no signature to its needle in the sewing machine and that consequently there would be an idle needle in the sewing machine and there would be a missing stitch in a chain of stitches across the signature group. To remedy this condition it is necessary to cut out one of the vanes 11 which may be done in the following manner: $11^a$, $11^b$, $11^c$, and $11^d$ represent a series of vanes in the gathering machine to which wires $18^a$, $18^b$, $18^c$, and $18^d$ are connected, said wires reaching at the other end to the guides of needles 87. Let us assume that hoppers $5^b$ and $5^d$ contain folded signatures and that hopper $5^c$ contains singles. A folded signature fed from hopper $5^d$ and falling on vane $11^d$ will during its forward movement into the straddling position on vane $11^c$ receive the line of glue as indicated from pipe 286. After the signature reaches its proper position on vane $11^c$ a single leaf is fed from hopper $5^c$ on top of the upper surfaces of the first signature, and thus the product coming from hoppers $5^b$ and $5^c$ will be caused to travel over wire $18^c$ shown in dotted lines as being connected to vane $11^c$. The signature coming from hopper $5^b$ will be placed on vane $11^b$ and will be brought into straddling position on vane $11^a$ and thence pass to the needles over wire $18^a$. It will therefore be evident that no signature will be passing from vane $11^b$ over wire $18^b$ shown in dotted lines. It is therefore necessary to cut out, so to speak, the connection between vane $11^b$ and the needles. Wire $18^b$ as shown in dotted lines is therefore disconnected from $11^b$ and connected as indicated in full lines to vane $11^c$ and wire $18^c$ as indicated in dotted lines is disconnected from vane $11^c$ and connected to vane $11^d$, etc. The result of this adjustment is that the idle needle 70 which is bound to be produced will be the first needle of the series and may therefore be disregarded.

In Figs. 14 to 20 inclusive is shown a modified form of the invention in which the tipping takes place after the signature group comes out of the gathering machine.

Referring to said Figs. 14 to 20 inclusive 501 indicates a gathering machine such as the well known Juengst gathering machine provided with a series of hoppers 502 and gripper arms 503, the latter of which takes signatures from the hoppers and places them in raceway 504. Raceway 504 consists of a main central channel 505 and recumbent inwardly opening end channels 506 and 507. Adjacent the hopper of the first signature, which is at the end of the gathering machine farthest from the tipping device, there is located an inclined support 508 above the main support 509 of the raceway (see Figs. 14, 15, 18 and 19). Lower end channel 506 extends from a point near inclined support 508 throughout the remainder of the gathering machine and through tipping machine. The precise point at which channel 506 begins is indicated at 510 and extending rearwardly from said channel is a flaring upper guide 511 and a lower auxiliary support 512. Extending throughout the raceway and into the tipping machine is a chain conveyor 513 having pins that push against the tail of the signatures in a manner well known. It will now be understood that the first signature $b$ is placed by a gripper arm upon inclined support 508 and auxiliary support 512, its folded back, if any there be, being on support 512. Chain 513 now engages the tail end of the signature and moves it to the left in Fig. 14 under guide 511 and into channel 506. The main body of signatures $a$ are now gathered one by one in superimposed relation resting on main support 509 and on top of channel 506 as will be most readily apparent from Fig. 19 and both signatures $b$ and $a$ are advanced as a unit by chain 513. Adjacent the hopper of the last signature $c$, that is nearest the tipping machine there is an inclined support 514 above main support 509; an auxiliary support 515 for the folded back of the signatures, said auxiliary support extending into channel 507 which latter begins at point designated by 516. 517 indicates an upper flaring guide extending from channel 507 and in spaced relation to auxiliary support 515. Channel 507 extends through the tipping device. It will now be understood that signature $c$ is placed by a gripper arm on supports 514 and 515 and as signatures $a$ and $b$ are advanced beneath said supports the chain will engage the tail end of signature c and will move it toward the left in Fig. 16 into channel 507. Thus the signatures are gathered in separated relation.

Intermediate gathering machine 501 and tipping machine 18 is a spiral raceway 519 similar to the one disclosed in U. S. Letters Patent No. 846,923 dated March 12, 1907, the details of which are not shown and it will be understood that this spiral raceway forms a continuation of the gathering machine raceway and that not only is the main channel twisted but the end channels 506 and 507 and the conveyer chain 513 are likewise twisted. Suitable upper guides similarly twisted are also provided. The function of the spiral is to move the signatures from a flatwise into an upright position. Mounted on the tipping machine in spaced and parallel relation with each other are channels 506ª and 507ª occupying an upright position which form continuation of recumbent channels 506 and 507 of the gathering machine and the space 505ª between these channels forms a continuation of the main channel 505 of the raceway 504 of the gathering machine. Channels 506ª and 507ª are at a higher level than channel 505ª so that the side portion of the outermost signatures of the central group a are exposed adjacent the back of the signatures. Paste wheels 536 can therefore apply a line of paste on the side of the outer signatures of the central group a. After the paste lines are applied the central group of signatures a and the signatures b and c are brought into alinement by means of ramp 534 after which suitable rollers or other members may act to squeeze the signatures together.

I claim:

1. A signature gathering machine comprising: a raceway having a lower compartment and a plurality of ledges, constituting a false bottom, a plurality of signature hoppers, means to take signatures from the hoppers and deposit them on the ledges, and conveying means to move the signatures from the ledges into the lower compartment and then along the lower compartment.

2. A signature gathering machine comprising: a raceway having a lower compartment and a plurality of ledges, constituting a false bottom, a plurality of signature hoppers, means to take signatures from the hoppers and deposit them on the ledges, and conveying means moving longitudinally of the raceway to move the signatures from the ledges into the lower compartment and then along the lower compartment.

3. A signature gathering machine comprising: a raceway having a lower compartment and a plurality of ledges, constituting a false bottom, a plurality of signature hoppers, swinging grippers moving transversely of the raceway to take signatures from the hoppers and deposit them on the ledges, and conveying means to move the signatures from the ledges into the lower compartment and then along the lower compartment.

4. A signature gathering machine comprising: a raceway having a lower compartment and a plurality of ledges, constituting a false bottom, a plurality of signature hoppers, swinging grippers moving transversely of the raceway to take signatures from the hoppers and deposit them on the ledges, and conveying means moving longitudinally of the raceway to move the signatures from the ledges into the lower compartment and then along the lower compartment.

5. A signature gathering machine comprising: a raceway having a lower compartment and a plurality of longitudinally inclined ledges, constituting a false bottom, a plurality of signature hoppers, means to take signatures from the hoppers and deposit them on the ledges, and conveying means to move the signatures from the ledges into the lower compartment and then along the lower compartment.

6. A signature gathering machine comprising: a raceway having a lower compartment and a plurality of longitudinally inclined ledges, constituting a false bottom, a plurality of signature hoppers, means to take signatures from the hoppers and deposit them on the ledges, and conveying means moving longitudinally of the raceway to move the signatures from the ledges into the lower compartment and then along the lower compartment.

7. A signature gathering machine comprising: a raceway having a lower compartment and a plurality of longitudinally inclined ledges constituting a false bottom, a plurality of signature hoppers, swinging grippers moving transversely of the raceway to take signatures from the hoppers and deposit them on the ledges, and conveying means to move the signatures from the ledges into the lower compartment and then along the lower compartment.

8. A signature gathering machine comprising: a raceway having a lower compartment and a plurality of longitudinally inclined ledges constituting a false bottom, a plurality of signature hoppers, swinging grippers moving transversely of the raceway to take signatures from the hoppers and deposit them on the ledges, and conveying means moving longitudinally of the raceway to move the signatures from the ledges into the lower compartment and then along the lower compartment.

9. In a signature gathering machine, a raceway comprising a slotted lower compartment and a superposed slotted false bottom, and a signature conveying means having pins projecting upwardly through both slotted compartment and false bottom.

10. In a signature gathering machine, a raceway comprising a lower compartment and a superposed false bottom, and means for conveying individual signatures along the false bottom and also signature groups along the lower compartment.

11. A signature gathering machine comprising: a plurality of hoppers, a raceway having a lower compartment and a plurality of overlapping ledges, constituting a false bottom, leading to the lower compartment, means for depositing folded signatures from the hoppers to the ledges with both halves of the signatures above the ledges, means for moving longitudinally the signatures thus deposited from the top of one ledge to the next ledge with one-half of the signature above and the other half below said next ledge, and then from said second ledge to a position in the lower compartment with both halves of the signature below a third ledge.

12. A signature gathering machine comprising: a plurality of hoppers, a raceway having a lower compartment and a plurality of overlapping ledges, constituting a false bottom, leading to the lower compartment, a guide extending from each ledge through the lower compartment, means for depositing folded signatures from the hoppers to the ledges with both halves of the signatures above the ledges, means for longitudinally moving the signatures thus deposited from the top of one ledge to the next ledge with one-half of the signature above and the other half below said ledge, and then from said next ledge along the guides in the lower compartment and below the next succeeding ledges.

13. A signature gathering machine comprising: a gathering conveyor moving in a straight-line path, means for depositing a signature in position to be advanced by said conveyor and for superimposing another signature thereon after the first signature has been advanced by the conveyor, and means for applying a line of paste to the first signature during its forward travel to receive the next signature to thereby paste the two signatures together.

14. A signature gathering machine comprising: a gathering conveyor moving in a straight-line path, means for depositing single and folded signatures in position to be advanced by such conveyor, and means for applying a line of paste between a single signature and an adjacent folded signature during the gathering operation while both signatures are moving in a straight-line path.

15. A gathering machine comprising: means for separating and thereafter holding in separated position the opposed halves of each of a plurality of signatures, and means for superposing said signatures side by side with their halves so held in slightly separated position.

16. A gathering machine comprising: means for separating and thereafter holding in separated position the opposed halves of each of a plurality of signatures, and means for piling the signatures with their halves so held in slightly separated position.

17. A signature gathering machine comprising: means for insetting a separating wire between the halves of each of a plurality of signatures, and means for onsetting the plurality of signatures with the separating wires inset.

18. The process of gathering folded signatures which consists in separating and thereafter holding in separated position the opposed halves of each of a plurality of signatures, and then associating the plurality of signatures side by side with their halves so held in slightly separated position.

19. The process of gathering folded signatures which consists in separating and thereafter holding in separated position the opposed halves of each of a plurality of signatures, and then piling the plurality of signatures with their halves so held in slightly separated position.

20. The process of gathering folded signatures which consists in insetting a separating wire between the halves of each of a plurality of signatures, and then onsetting the plurality of signatures with the separating wires inset.

21. The method of assembling a book which consists in applying while a signature is moving in a straight-line path, a paste line on the outside of said signature parallel to its folded back, and then associating, while said signature is in motion, another signature in onset relation to the first one thereby pasting the two signatures together.

22. A signature gathering machine including: a raceway having a lower compartment and a plurality of ledges constituting a false bottom, means for depositing a folded signature on a ledge, a sucker to lift one corner of one-half of the signature as it lies on the ledge, a separating member to move between and separate the halves of the signature, and conveying means to move the signature from the ledge to the next ledge with one-half of the signature above and the other half below the said next ledge.

23. A signature gathering machine including: a raceway having a lower compartment and a plurality of ledges constituting a false bottom, means for depositing a folded signature on a ledge, a sucker to lift one corner of one-half of the signature, as it lies on the ledge, a separating member to move between and separate the halves of the signature, and conveying means to move the signature from the ledge to the next ledge with one-half of the signature above and the other half below the said next ledge, and then from said second ledge to a position in the lower compartment with both halves of the signature below a third ledge.

24. A gathering machine comprising: a horizontally-disposed elongated raceway to receive signatures in superimposed relation, and means for tipping one signature to another along said raceway during the gathering operation.

25. A gathering machine comprising: a plurality of signature hoppers, a conveyor for the signatures moving past the hoppers, means for delivering signatures from the hoppers to a plurality of supports above the conveyor, and means on the conveyor to move the signatures off the supports and onto the conveyor.

26. A gathering machine comprising: a plurality of signature hoppers, a conveyor for the signatures moving past the hoppers, means for delivering signatures from the hoppers to a plurality of positions at substantially uniform level above the conveying means, and means on the conveyor to move the signatures onto the conveyor.

27. In a signature gathering machine, a raceway having a false bottom comprising a series of over-lapping ledges and means for conveying individual signatures in straddling position along said ledges.

28. In a signature gathering machine, a raceway having a false bottom comprising a series of over-lapping ledges forwardly and downwardly inclined and means for conveying individual signatures in straddling position along said ledges.

29. In a signature gathering machine, a raceway comprising a slotted lower compartment and a slotted false bottom arranged thereover and comprising a series of over-lapping ledges, and means for conveying individual signatures along said ledges and also signature groups along the lower compartment.

30. In a signature gathering machine, a raceway comprising a slotted lower compartment and a slotted false bottom arranged thereover and comprising a series of over-lapping ledges, and travelling pins projecting through the slots in said compartment and bottom for conveying individual signatures along said ledges and also signature groups along the lower compartment.

Signed at New York, in the county of New York and State of New York, this 29th day of June, 1925.

CHARLES A. JUENGST.